May 27, 1930. W. J. GAGNON 1,760,825
RING ATTACHMENT FOR CHAINS
Filed Sept. 26, 1929

INVENTOR
WILLIAM J. GAGNON
by his attorneys
Howson and Howson

Patented May 27, 1930

1,760,825

UNITED STATES PATENT OFFICE

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT

RING ATTACHMENT FOR CHAINS

Application filed September 26, 1929. Serial No. 395,448.

My invention relates to chains and attachments therefor, particularly attachments for the ends of such chains. The invention is especially useful in connection with ball chains to which use, however, it is not necessarily confined.

One form of the invention is illustrated in the accompanying drawings in which—

Figure 1:
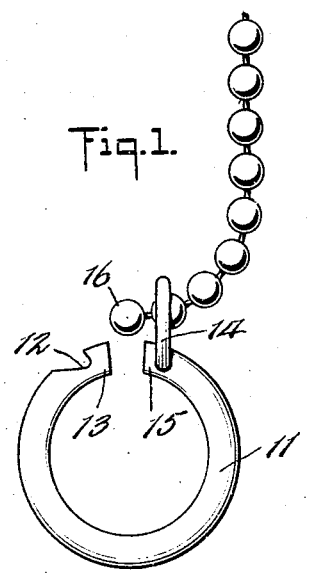
Figure 1 is an elevation showing a ball chain and ring attachment unconnected.

In the past various means have been provided, for attaching a ring to a chain, but where reliance has been placed on some attaching means other than the resiliency of the ring, this attaching means has been less handy and less easily applied than is that to which the present invention is directed.

The present invention embodies essentially an attachment for a chain comprising an open ended ring 11 having means for pulling together and fastening the ring ends about a chain link. The means referred to may consist of a notch 12 adjacent one of the ring ends 13, a loop 14 fastened adjacent the unnotched ring end 15 adapted to engage with the notch 12, and recesses in the ring ends. The ring is resilient and its ends are recessed in order to accommodate a link of the chain between them. The ring ends may, of course, be recessed by making the ring hollow as shown in Figures 3 and 4.

Figure 3:
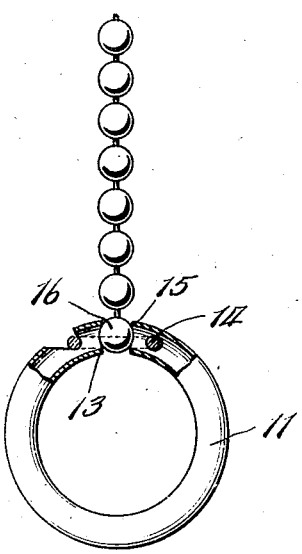
Fig. 3 is a view similar to Fig. 2 certain parts being shown in section, and below
Figure 2:
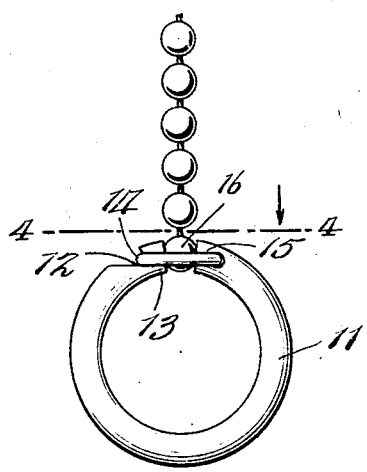
Fig. 2 is a similar view showing the chain and ring connected.
Figure 4:
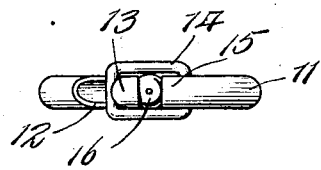
Fig. 4 is a section on the line 4—4 of Fig. 2.

In the case illustrated, which is an attachment for ball chain, the ring ends 13 and 15 are normally separated by a distance which is slightly greater than the diameter of a chain ball; and the loop 14 is made of such length that when engaged with the notch 12 it will pull together and grip the ends about a chain ball 16 as illustrated in Figures 2, 3, and 4.

There is thus provided a chain end comprising an end link 16 an open ended ring 11 having a notch 12 adjacent one of its ends 13 and a loop 14 fastened adjacent the unnotched end 15 adapted to engage with the notch 12 and pull together and fasten the ring ends about the link 16.

While the invention has been specifically described and illustrated with respect to an attachment for ball chain it must be apparent that it is equally applicable to other types of chain.

The ring attachment claimed may be used with any type of chain composed of elements forming alternate enlarged and reduced portions, whether a ball chain or not, as for instance an ordinary link chain. With the understanding, therefore, that the invention is not limited to the particular description given and the embodiment specifically illustrated in the drawings.

I claim:

1. An attachment for a chain comprising an open-ended ring having a notch adjacent one of its ends, and a loop fastened adjacent the unnotched end of the ring, adapted to engage with the notch.

2. An attachment for chains composed of elements forming alternate enlarged and reduced portions, comprising a resilient ring having open recessed ends, and means for pulling said ends together and causing them to grip a chain element.

3. An attachment for ball chains comprising a resilient ring having open recessed ends separated by a distance which is slightly greater than the diameter of a chain ball, and means for pulling together said ends and causing them to grip a chain ball.

4. An attachment for ball chains comprising a resilient ring having open recessed ends separated by a distance which is slightly greater than the diameter of a chain ball, and a loop adjacent one end engaging with a notch cut adjacent the other end for pulling together and fastening said ends about a chain ball.

5. An attachment for ball chains comprising a hollow ring having open ends separated by a distance which is slightly greater than the diameter of a chain ball, and means for pulling together and fastening said ends about a chain ball.

6. An attachment for ball chains comprising a hollow ring having open recessed ends separated by a distance which is slightly greater than the diameter of a chain ball, and a loop adjacent one end engaging with a notch cut adjacent the other end for pulling together and fastening said ends about a chain ball, substantially as described.

7. A chain end comprising an end link, an open ended ring having a notch adjacent one of its ends, and a loop fastened adjacent the unnotched ring end adapted to engage with the notch and pull together and fasten the chain ends about said end link.

In testimony whereof I have signed my name to this specification.

WILLIAM J. GAGNON.